United States Patent
Justus et al.

(12)

(10) Patent No.: US 6,435,290 B1
(45) Date of Patent: Aug. 20, 2002

(54) PERSONAL TRACKED VEHICLE

(75) Inventors: Michael K. Justus; Lesley Justus, both of Beloit, WI (US)

(73) Assignee: MMMJ Inc., Beloit, WI (US)

( * ) Notice: Subject to any disclaimer, the term of this patent is extended or adjusted under 35 U.S.C. 154(b) by 0 days.

(21) Appl. No.: 09/742,788

(22) Filed: Dec. 20, 2000

(51) Int. Cl.$^7$ .............................................. B62D 55/00
(52) U.S. Cl. ........................ 180/9.1; 180/9.64; 180/181
(58) Field of Search ........................ 180/9.1, 9.4, 9.62, 180/9.64, 180, 181; 280/14.21, 14.22, 14.27, 14.28

(56) References Cited

U.S. PATENT DOCUMENTS

| | | | |
|---|---|---|---|
| 3,554,310 A | | 1/1971 | Dieffenbach |
| 3,568,787 A | | 3/1971 | Gremeret |
| 3,692,132 A | | 9/1972 | Pollanen |
| 3,794,131 A | | 2/1974 | Freedman et al. |
| 3,823,790 A | | 7/1974 | Richison et al. |
| 4,143,728 A | | 3/1979 | Shiber |
| 4,307,788 A | | 12/1981 | Shelton |
| 4,534,437 A | | 8/1985 | Howerton et al. |
| 4,600,073 A | | 7/1986 | Honett |
| 4,984,648 A | | 1/1991 | Strzok |
| 5,127,488 A | | 7/1992 | Shanahan |
| 5,135,243 A | * | 8/1992 | Carpenter .................. 280/7.14 |
| 5,263,745 A | * | 11/1993 | Storey ......................... 280/483 |
| 5,305,846 A | * | 4/1994 | Martin ........................ 180/181 |
| 5,653,455 A | * | 8/1997 | Richards ..................... 280/19 |
| 5,662,186 A | | 9/1997 | Welch |
| 5,927,735 A | * | 7/1999 | Hosoda ................... 280/87.042 |
| 5,975,229 A | * | 11/1999 | Hosoda ....................... 180/181 |
| 6,189,899 B1 | | 2/2001 | Carlson |
| 6,193,003 B1 | | 2/2001 | Dempster |

FOREIGN PATENT DOCUMENTS

| | | |
|---|---|---|
| FR | 1241947 A | 12/1960 |
| FR | 92 03765 | 9/1993 |
| JP | 6-23087 | * 2/1994 |

OTHER PUBLICATIONS

Printouts from www. Dirtthingz.com (Jun. 26, 2000).
U.S. App. No. 09/621,709, filed Jul. 24, 22000, applicant Michael K. Justus.

* cited by examiner

*Primary Examiner*—Avraham Lerner
(74) *Attorney, Agent, or Firm*—Lathrop & Clark LLP

(57) ABSTRACT

A land vehicle has a flexible central frame member which extends from a large front roller to a smaller rear roller, and is encircled by a flexible looped belt having projecting treads. An engine mounted above the belt drives the front roller, and two bogie wheels engage the belt within valleys formed in the treads. Two boot supports are fixed to the central frame member which support the feet of a standing rider. Rollers fixed to the central frame member support the belt as it travels around the frame. The minimal extent of the frame outside the belt exposes a substantial length of the belt edge to engagement with the ground, making it possible to control the vehicle by twisting and tipping, in a manner similar to the control of a conventional unpowered snowboard. A trailer or sled may be connected to the rear of the vehicle for towing cargo.

24 Claims, 6 Drawing Sheets

PERSONAL TRACKED VEHICLE

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to vehicles in general, and in particular to compact vehicles intended for use by a single operator.

The snowboard has enjoyed success as a recreational vehicle, providing the exhilaration of downhill skiing, with the added elements of control provided by having only a single board to which both of the rider's feet are connected. Like its predecessor, the skateboard, the snow board is generally controlled without poles or other accessories, instead relying on the rider's posture, movement of center of gravity, and by adjusting the position of the board by lifting or moving the user's feet where connected to the board.

Unlike a skateboard, a conventional snowboard is substantially limited to downhill travel on snow covered terrain. Several approaches to motorizing a snowboard have been suggested. In one approach, a motor driven continuous belt or track is mounted to a wide ski, and travels beneath the ski to advance the board. These vehicles use the track as an accessory to the slipping surface of the ski for downhill travel. Another approach employs a curved frame with an encircling track, with a center mounted motor. However, prior art devices, because of their construction, have sacrificed some of the control aspects conventionally used by the snowboard rider, thereby failing to fully make use of the skills developed by the snowboard rider, or compromising the maneuverability of the vehicle.

What is needed is a powered vehicle which simulates the controllability of a snowboard, while being capable of being used on upwardly inclined or level surfaces, whether covered by snow or not.

SUMMARY OF THE INVENTION

The personal tracked vehicle of this invention has a flexible central frame member which extends from a large front roller to a smaller rear roller, and which is encircled by a flexible looped belt having projecting treads. A gasoline engine mounted above the belt drives the front roller, and two bogie wheels engage the belt within valleys formed in the treads. Two boot supports are fixed to the central frame member, and support the feet of a standing rider. Rollers fixed to the central frame member support the belt as it travels around the frame. The minimal extent of the frame outside the belt exposes a substantial length of the belt edge to engagement with the ground, as well as the stiff lips of the rollers, making it possible to control the vehicle by twisting and tipping, in a manner similar to the control of a conventional unpowered snowboard. A trailer or sled may be connected to the rear of the vehicle for towing cargo, and by provision of a tiller, the sled may be used to steer the vehicle.

It is an object of the present invention to provide a motorized vehicle which is controlled in a fashion similar to a conventional snowboard.

It is another object of the present invention to provide a personal vehicle for operation on snow, grass, mud, and other surfaces.

It is a further object of the present invention to provide a highly maneuverable vehicle for operation by a single standing rider.

It is an additional object of the present invention to provide a compact motorized vehicle capable of hauling cargo in a sled.

It is also an object of the present invention to provide a tracked vehicle capable of descending hills under gravity, and of traveling on level ground under power.

It is yet another object of the present invention to provide a tracked vehicle with a very low center of mass.

It is a still further object of the present invention to provide a personal vehicle which is readily steered while carrying cargo.

Further objects, features and advantages of the invention will be apparent from the following detailed description when taken in conjunction with the accompanying drawings.

DESCRIPTION OF THE PREFERRED EMBODIMENTS

Figure 1:
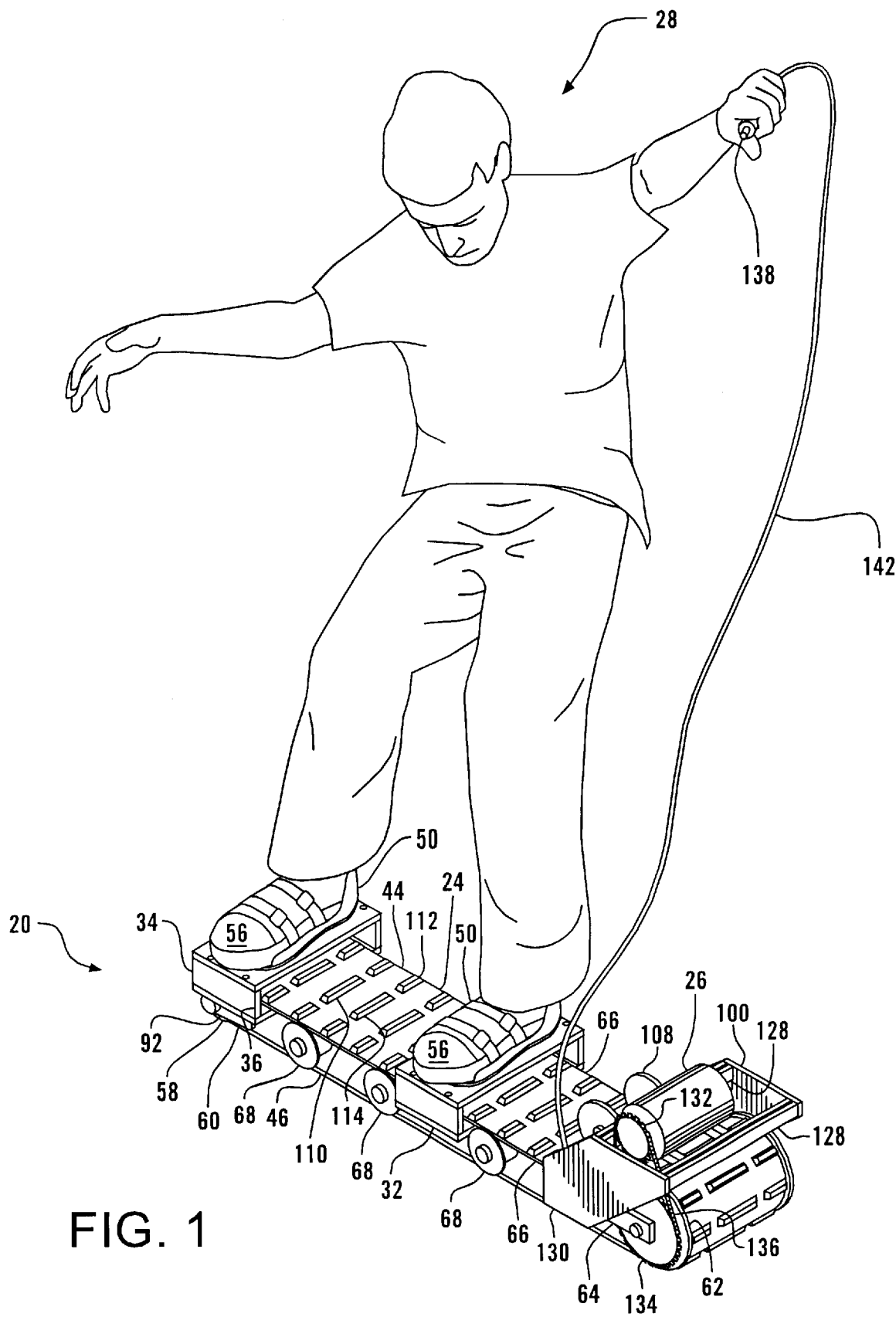
FIG. 1 is a perspective view of the personal tracked vehicle of this invention, showing a rider thereon.
Figure 2:
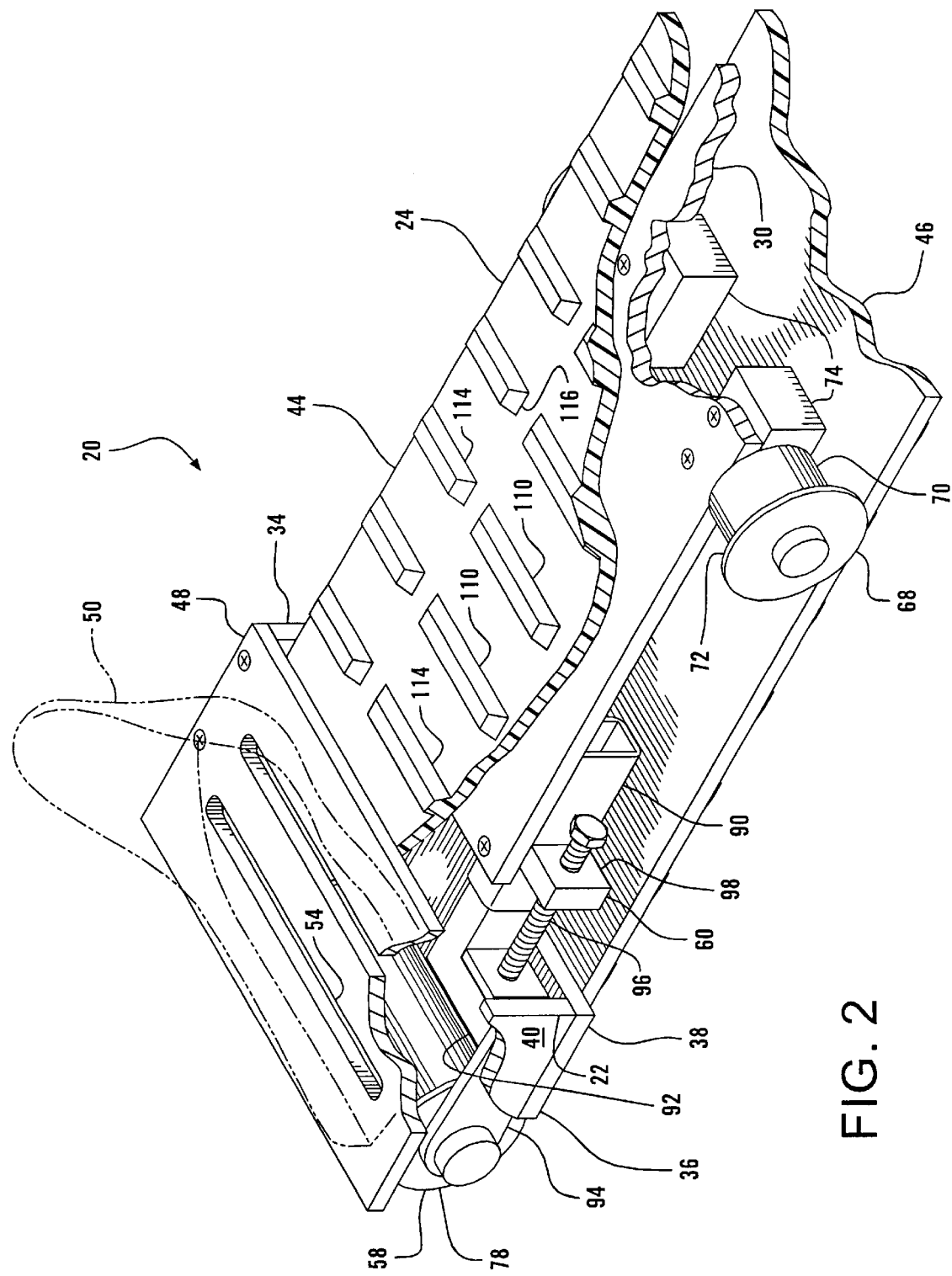
FIG. 2 is a fragmentary isometric view, partially broken away in section, of the rear of the personal tracked vehicle of FIG. 1.

Referring more particularly to FIGS. 1–7, wherein like numbers refer to similar parts, a personal tracked vehicle 20 is shown in FIG. 1. The vehicle 20 has a frame 22 which supports a flexible looped belt 24 which is driven by a small gasoline engine 26 to transport a single rider 28.

Figure 4:
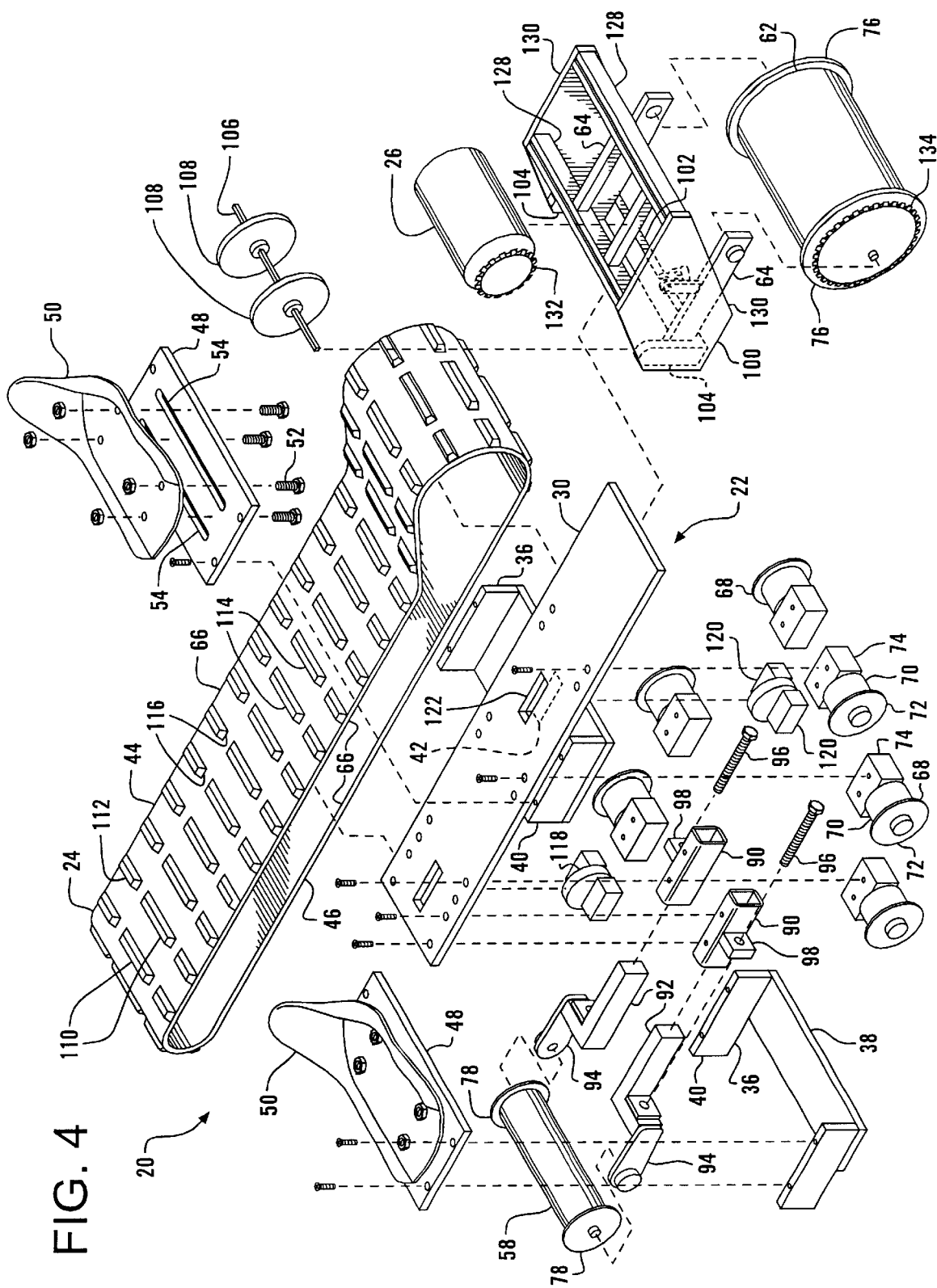
FIG. 4 is an exploded isometric view of the personal tracked vehicle of FIG. 1.

As shown in FIG. 4, the frame 22 is constructed around a central frame member 30 which extends in the front to back direction and which is sturdy but flexible. The central frame member 30 is preferably comprised of a laminate of a plurality of layers of material or a composite material such as reinforced plywood or fiberglass, or HDPE plastic reinforced with a light tension spring. Although illustrated as of a constant thickness, the central frame member 30 is preferably constructed of a tapered member which is narrower at the ends and thicker at the center, for example, extending from a center region that is about one inch thick, to about 3/8 inch thick at the ends near the front and rear of the vehicle 20. A front boot support 32 and a rear boot support 34 are fixed to the central frame member 30. Each boot support 32, 34 has a boot bracket 36 with a lower plate 38 and two upwardly extending side plates 40. Each boot bracket lower plate has a roller slot 42, and is connected by fasteners to the underside of the central frame member 30.

The belt 24 is mounted on the frame to define an upper run 44 which extends over the central frame member 30, and a lower run 46 which extends beneath the central frame member. The side plates 40 of the boot brackets 36 extend upwardly above the level of the belt upper run 44. A boot plate 48 is fastened between each pair of side plates 40 and is supported by the side plates above the belt 24. Each boot plate 48 has two parallel slots 54 formed therein. A boot binding 50 is adjustably fastened to each of the plates 48 by fasteners 52 which extend into the boot plate slots 54 to permit the sliding and adjustable positioning of the bindings 50 with respect to the boot plates. The shoes or boots 56 of the rider 28 are securely fastened within the bindings 50 as shown in FIG. 1. Any conventional snowboard or ski type binding may be employed.

The belt 24 may be formed of a conventional flexible belt material, for example, rubber or polymer with strands of reinforcing material. The belt 24 extends between a rear roller 58 mounted by a slack take-up assembly 60 to the frame 22, to a front roller 62 which extends frontwardly from the frame on two opposed front roller arms 64. The rear roller 58 is approximately 2½ inches in diameter, while the front roller 62 is substantially larger, for example 7 inches in diameter. The large diameter of the front roller permits the vehicle to pass over sticks, logs, trail debris, and rough terrain. The front roller 62 has lips 76 on each side of the belt which protrude slightly above the level of the belt. The rear roller 58 is also provided with lips 78 on each side of the belt.

Figure 6:
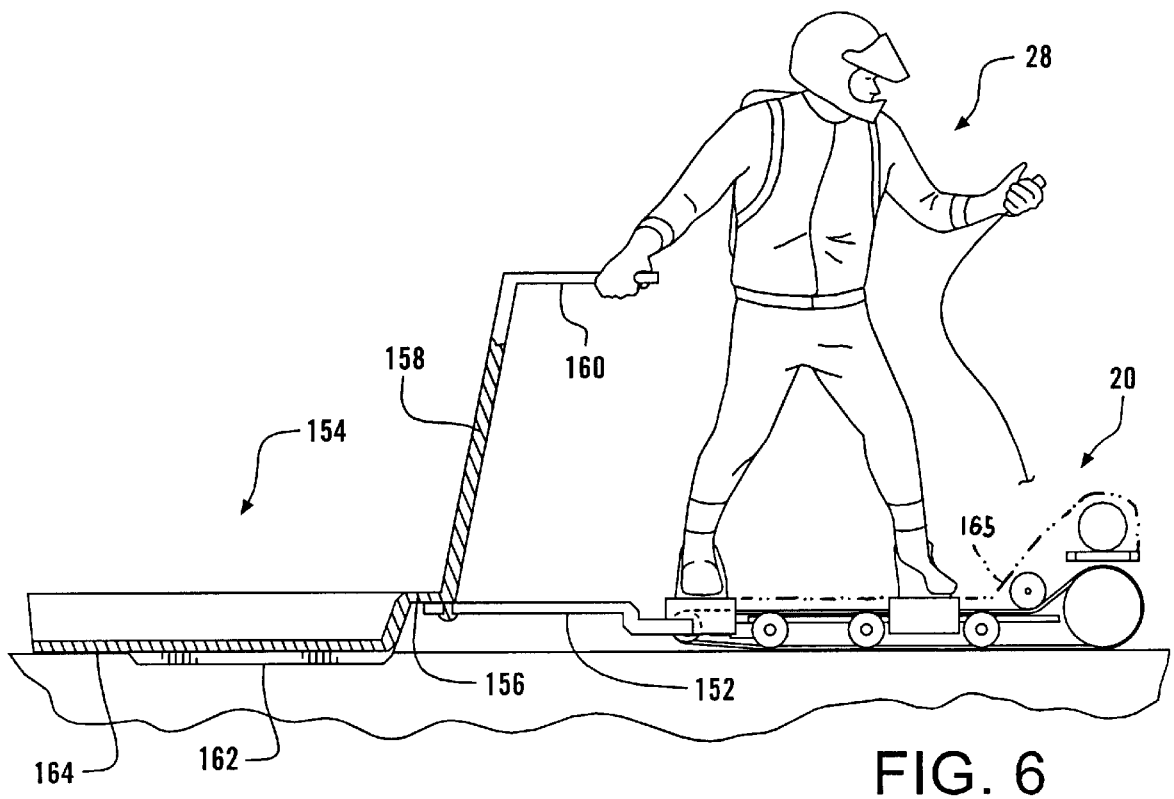
FIG. 6 is a fragmentary side elevational view, partially broken away in section, of the vehicle of of FIG. 1 towing an alternative embodiment trailer.

For optimal performance, the vehicle 20 provides substantial potential engagement between the edges 66 of the belt 24 and the supporting surface, whether snow, grass, gravel, mud or blacktop. This edge engagement greatly contributes to giving the vehicle 20 the feel and controllability of a conventional snowboard. The effective maneuverability of the board is also contributed to by the lips of the front roller, the rear roller, and the side rollers 68. The belt 24 is supported at its edges as it travels from the front roller 62 to the rear roller 58 by six side rollers 68. Each side roller 68 has a cylindrical body 70 and a radially protruding lip 72. The side roller 68 bodies 70 are somewhat larger than the rear roller, for example about three inches in diameter. The smaller diameter rear roller is mounted with its axis elevated above the axes of the side rollers, so that the belt extends upwardly from the ground as it approaches the rear roller, as shown in FIG. 6, making the rear of the board easier to kick around by the rider. The rigid protruding lips of the rollers not only help to guide the belt, but also allow the rider to dig an edge in on an icy surface, contributing to control of the vehicle. The lips may protrude about ⅜ of an inch from the bodies of the rollers.

Each side roller 68 is rotatably mounted to a block 74 which is fastened to the underside of the central frame member 30. Rigid axles are fixed to the blocks 74, and bearings within the rollers 68 mount the side rollers for rotation about the fixed axles. The side rollers 68 are mounted to the central frame member in opposed pairs. The side rollers 68 in a pair are spaced sidewardly from one another. Each side roller 68 body 70 has portions which engage the belt as it travels over the side rollers, and portions which engage the belt as it travels beneath the side rollers. The belt 24 is driven by frictional engagement with the front roller 62, and hence the apparatus is very simple. Should momentary slippage of the belt occur, the drive will still perform satisfactorily.

The appropriate tension is applied to the looped belt 24 by the slack take-up assembly 60. The slack take-up assembly 60 is comprised of two side tubes 90, shown in FIG. 4, which are fastened to the central frame member 30 rearwardly of the rear boot support 34. Two roller arms 92 are slidably received within the side tubes 90. The roller arms 92 have side ears 94 between which the rear roller 58 is mounted. Threaded bolts 96, shown in FIG. 2, extend between tabs 98 fixed to the side tubes 90 and portions of the roller arms 92. Rotation of the bolts 96 adjusts the spacing between the frame 22 and the rear roller 58 permitting the take-up of slack in the belt 24. Alternatively, coil springs could be used to set the tension on the belt in place of the take up assembly.

The front roller 62 is rotatably mounted between two front roller arms 64 which extend frontwardly from a motor support assembly 100 which forms a part of the frame 22. The motor support assembly 100 has a rear cross member 102 which is fixed to the central frame member 30. Two side members 104 extend upwardly from the rear cross member 102 and receive a bogie wheel axle 106 therebetween. Two stiff rubber or plastic bogie wheels 108 are mounted to the axle 106. The bogie wheels 108 are fixed to the axle 106, while the axle rotates on the side members 104. The belt 24 passes beneath the bogie wheels 108 and around the front roller 62. The front roller 62 is substantially larger in diameter than the rear roller and the side rollers. The bogie wheels 108 cause the belt 24 to wrap around more than 180 degrees of the circumference of the front roller 62, preferably in a range of about 210 to 270 degrees of wrap. The bogie wheels mounted above the belt enables the looped belt to have a very small height, around 3 three inches. This low profile contributes to the maneuverability of the vehicle. The rider, standing just above the belt and rearward of the motor, is brought very low to the ground. It is important to note that operation of this vehicle requires the rider to be constantly aware of his balance, and to maintain his center of gravity within the footprint of the tread. The low profile of the vehicle contributes to the rider keeping the combined center of gravity of rider and vehicle within the footprint of the tread, and thus to resist the tendency to tip over. The higher the center of mass, the more reduced is the angle which the rider can tilt before the board will tip over. Hence, the low profile belt allows for a greater angle of tilt of the rider in steering, and hence greater maneuverability. The greater diameter of the front roller aids the vehicle 20 in advancing over raised obstacles and changes in elevation.

As shown in FIG. 4, the belt 24 has an array of parallel treads 110 which extend entirely around the belt. Each tread has three segments: two edge segments 112 positioned adjacent the edges of the belt 24, and a center segment 114 positioned between the two edge segments. The edge segments 112 are spaced from the center segments to define valleys 116 of zero height projection. At the valleys, the belt may be from ⅛ to ¼ inch thick, and is preferably about 3/16 inch thick. The valleys of all the treads 110 are aligned to allow the bogie wheels 108 to pass through the valleys. The segments 112, 114 of the treads are beveled. Thus the bogie wheels tend to retain the belt 24 in proper side to side orientation on the frame 22. The beveled outer edges of the edge segments 112 contribute to slip from side to side when shifting weight in snow or soft materials.

Two center rollers 118 of the same diameter as the side rollers are rotatably mounted between pairs of blocks 120 fastened to the underside of the central frame member 30. The center rollers 118 project upwardly through roller slots 122 formed in the central frame member 30. If positioned above the boot support lower plates 38, as illustrated, the lower plates must also be provided with slots 42 thereby permitting the center rollers 118 to engage both the upper run 44 and the lower run 46 of the moving belt. It should be noted that, in certain designs, it may be desirable to position a roller on the underside of the boot plate 48 to reduce frictional engagement between the top surface of the belt and the boot plate.

Figure 3:
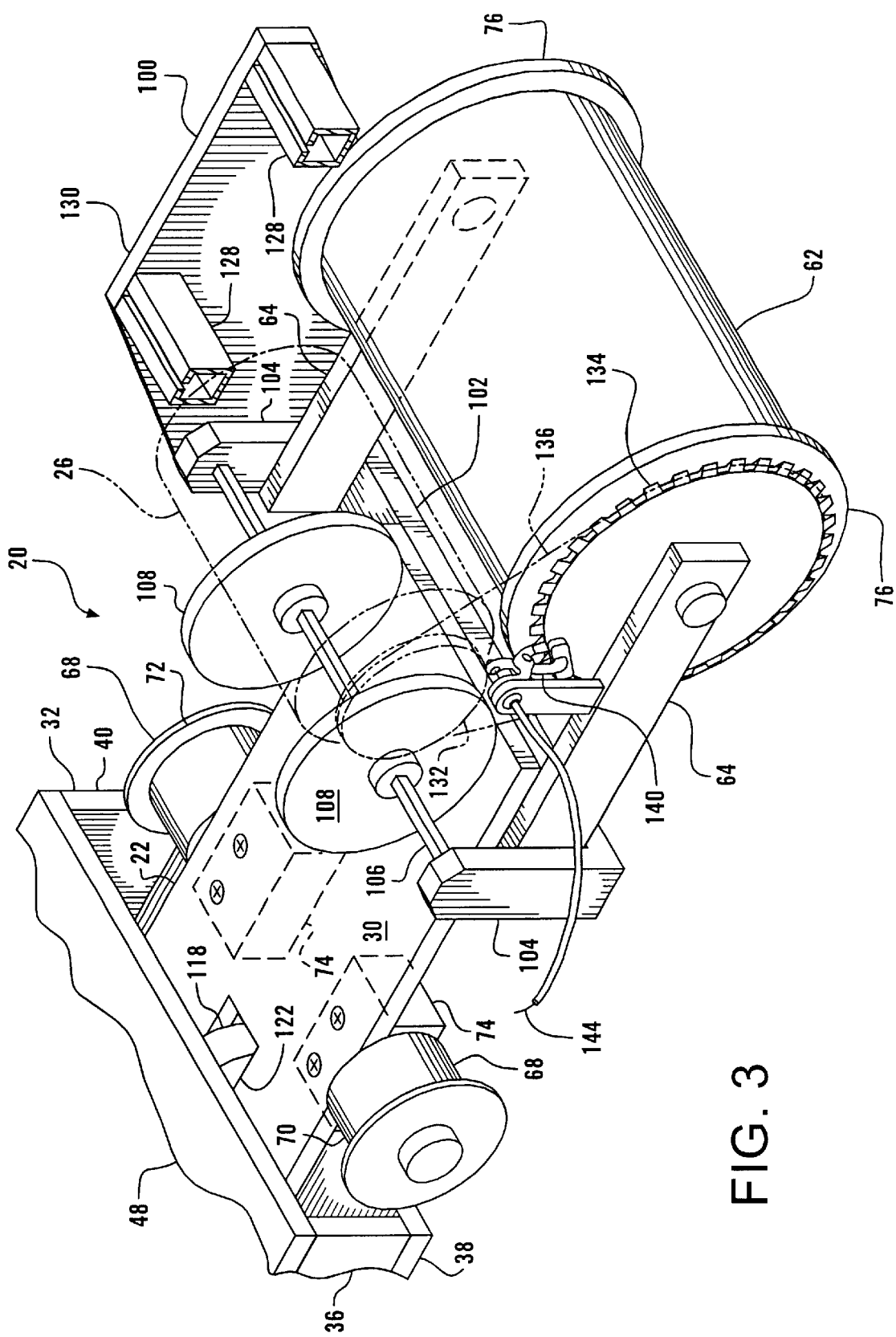
FIG. 3 is a fragmentary isometric view, partially broken away in section, of the front portion of the personal tracked vehicle of FIG. 1.

A motor 26, for example a two cycle 5 hp gasoline engine with a centrifugal clutch, is mounted to upper crossbars 128 extending between side plates 130 of the motor support 100. The crossbars 128 support the motor 26 above the front roller 62. The motor rotates a drive sprocket 132 with a 7:1 or 6:1 reduction. The front roller may be rotated at from about 100 to 1500 rpm. As indicated in FIG. 3, the drive sprocket is connected by a chain 136 in driving relation to a front roller sprocket 134 fixed to the front roller 62. Rotation of the drive sprocket at its top speed would result in a vehicle speed of about 20–40 mph. Because of the centrifugal clutch with which the motor is provided, the vehicle 20 will freewheel when going downhill.

As shown in FIG. 1, the rider mounts the vehicle 20 and fastens the bindings 50 about his boots 56 and takes in one hand a velocity control stick 138 which is connected by a flexible conduit 142 to the motor 26 and a brake caliper 140 operating with respect to the front roller sprocket 134. The velocity control stick 138 has two controls: a thumb operated throttle and a finger or hand operated brake. Both controls operate through cables 144 which extend through the conduit 142 to the engine throttle and to the brake caliper 140, shown in FIG. 3. When actuated, the brake caliper 140 grips the front roller sprocket 134 to slow down the vehicle 20.

Figure 5:
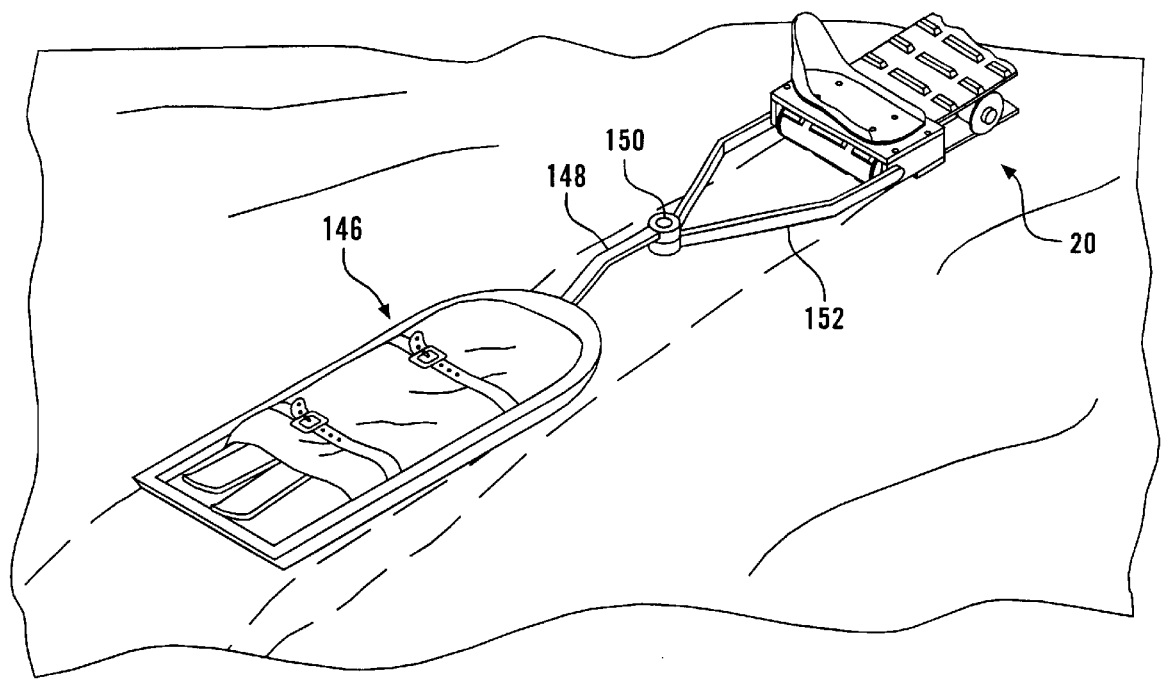
FIG. 5 is a fragmentary isometric view of the vehicle of FIG. 1 towing a trailer.

The vehicle 20 is particularly advantageously employed on snow-covered surfaces because of the wide footprint of the track. Used by itself the vehicle 20 can travel at high speeds and is very maneuverable in a fashion similar to the operation of a conventional snowboard. However, the vehicle 20, as shown in FIGS. 5 and 6, may also be used for hauling cargo by the attachment of a sled. In a first embodiment, shown in FIG. 5, the sled 146 is a fiberglass assembly having a frontwardly extending tongue 148 which is connected by a pin 150 to a rigid yoke 152 which extends rearwardly from the rear roller arms 92. The vehicle 20 with the sled 146 attached is steered and operated in a conventional fashion just as a snowboard would be operated.

An alternative embodiment sled 154, shown in FIG. 6, has a frontwardly extending tongue 156 which connects to the yoke 152 extending rearwardly from the vehicle 20, but is steered by a tiller 158 which extends upwardly from the sled tongue 156 and which has a front to back extending handle 160 which is grasped by the rider 28. When the sled 154 is attached to the vehicle 20, steering is accomplished by rotating the handle 160 to turn the sled and thereby modify the direction of the vehicle. The sled is preferably provided with a downwardly protruding central strip 162 which extends below the general underside 164 of the sled into engagement with the snow, mud, or surface over which the sled travels, and restricts the slipping of the sled on the surface, allowing the sled to act more effectively as a steering mechanism. When the vehicle 20 is pulling the sled, with the rider holding the tiller, the sled acts like a rudder, forcing the tail of the vehicle around, steering it, without requiring the rider to shift his center of mass, or to kick around the rear of the vehicle. Such a lower energy steering arrangement is appropriate for using the vehicle for utility purposes, such as towing ice fishing supplies, camping equipment, and the like.

It should be noted that, for clarity of illustration, the vehicle 20 has been shown in most figures without appropriate protective coverings. In a preferred embodiment moving parts of the vehicle such as the belt and the motor will be shielded from contact with the operator. A fiberglass cowling 165, as shown in phantom lines in FIG. 6, will preferably extend over most of the top surface of the belt and the motor on the motor support assembly. The cowling may be removably fastened to the central frame member and the non-moving parts of the vehicle such as the boot supports, the motor support assembly, and the rear roller arms.

Figure 7:
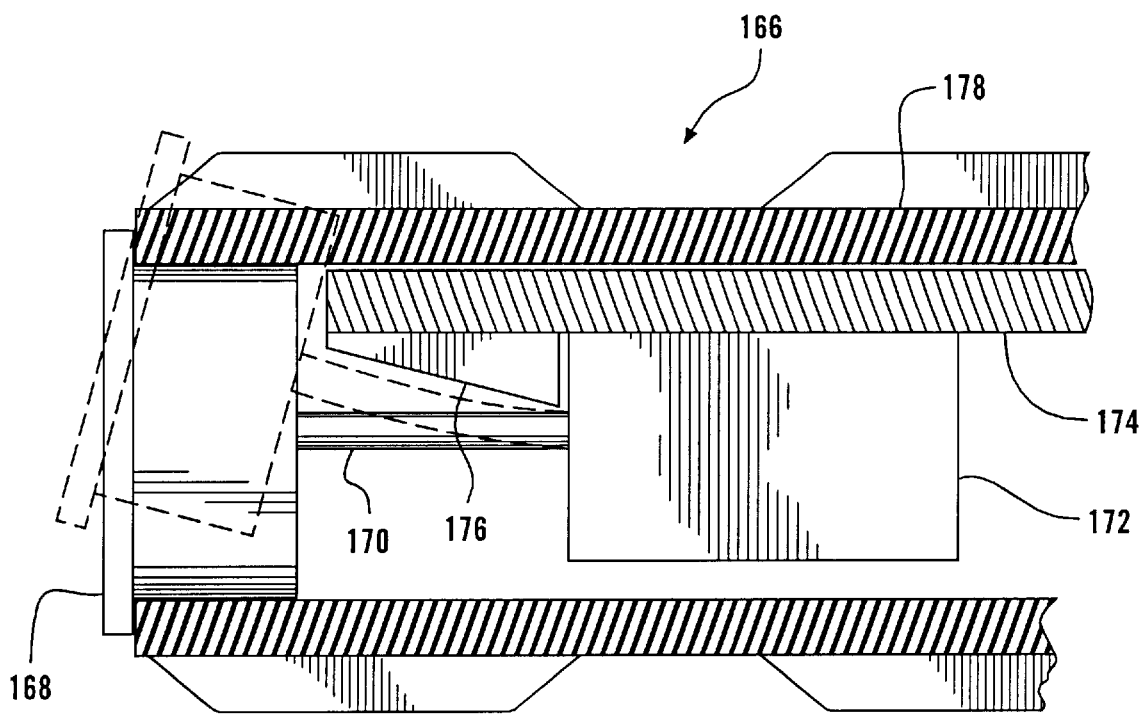
FIG. 7 is a fragmentary cross-sectional view of an alternative embodiment vehicle of this invention, have side rollers mounted on flexible axles.

As shown in FIG. 7, an alternative embodiment vehicle 166 may be provided with side rollers 168 which are mounted on flexible axles 170. The axles 170 may be formed of carbon fiber or spring steel. The side rollers 168 have bearings which rotate on the axles 170. The axles 170 are fixed at one end to a block 172 which is connected to the underside of the center frame member 174. The axles 170 project from the block 172, and a stop 176 is positioned above each axle to limit the upward deflection of the axle. The flexible axles 170 on the side rollers contribute to a vehicle which is more maneuverable, and controllable, as the outer edges of the belt 178 will conform more to the surface over which the vehicle 166 is traveling.

It should be noted that the vehicle 20 could be longer or shorter than illustrated, with a greater or lesser number of side rolls. Furthermore, although the boot supports have been illustrated as being assembled from plates, they may also be formed as unitary aluminum extrusions, or as a lower U-shaped extrusion with an attached top plate. Moreover, the motor, although disclosed as being attached at the front of the vehicle, could also be mounted between the front and rear boot supports. In addition, the looped belt could be split into two parallel belts running in the same direction.

It is understood that the invention is not limited to the particular construction and arrangement of parts herein illustrated and described, but embraces such modified forms thereof as come within the scope of the following claims.

What is claimed is:

1. A personal vehicle comprising:

a frame having a central frame member which extends from front to back;

a front roller mounted to the frame;

a rear roller mounted to the frame rearward of the front roller;

a continuous belt which extends around the front roller and the rear roller;

a first boot support fixed to the frame and having portions which extend above the belt to support a rider's first boot;

a second boot support fixed to the frame and having portions which extend above the belt to support a rider's second boot, wherein the belt extends through the first boot support and the second boot support:

a plurality of side rollers fixed to the central frame and positioned within the belt, wherein the central frame member is flexible, and permits vertical displacement of the side rollers with respect to one another; and a motor fixed to the frame to drive at least one of said rollers.

2. The personal vehicle of claim 1 further comprising at least one bogie wheel fixed to the frame and disposed to engage the exterior of the belt, the at least one bogie wheel causing the belt to engage the front roller over greater than 180 degrees of the circumference of the front roller.

3. The personal vehicle of claim 2 wherein the belt has a plurality of spaced parallel treads, wherein each tread has multiple segments, the segments of each tread being spaced from one another to define at least one valley, the valleys of all the treads being aligned to allow the at least one bogie wheel to pass through the valleys, and thereby restrict the sideward movement of the belt with respect to the frame.

4. The personal vehicle of claim 1 wherein each boot support has an upper boot plate, each boot plate having at least two parallel slots formed therein, and wherein a binding is supported on the boot plate, the binding having portions which extend into the boot plate slots to permit the sliding and adjustable positioning of the bindings with respect to the boot plate.

5. The personal vehicle of claim 1 wherein the central frame member has at least one central slot, positioned between side rollers on opposite sides of the central frame member, and further comprising a center roller rotatably mounted to the central frame member and having portions which extend through the slot to engage the belt as it travels over the central frame member, and portions of the roller extending beneath the central frame member to engage the belt as it travels beneath the central frame member.

6. The personal vehicle of claim 1 wherein there are at least two side rollers comprised of a first side roller and a second side roller, both side rollers being rotatably mounted to blocks which are fixed to the underside of the central frame member, the first side roller being spaced sidewardly from the second side roller, each side roller having portions which engage the belt as it travels over the side rollers, and which engage the belt as it travels beneath the side rollers.

7. The personal vehicle of claim 1 further comprising a control grip connected by a flexible member to the frame, the control grip having controls thereon to permit the rider to adjust the velocity of the motor, as well as to apply a braking force to the velocity of the belt.

8. The personal vehicle of claim 1 wherein the central frame member is comprised of a laminate of a plurality of layers of material.

9. The personal vehicle of claim 1 wherein a first side tube is mounted to the frame rearwardly of the first and second boot supports, and a second side tube is mounted to the frame across from the first side tube, and wherein a first roller arm extends rearwardly from the first side tube, and a second roller arm extends rearwardly from the second side tube, and wherein the rear roller is rotatably mounted between the first roller arm and the second roller arm, and wherein the roller arms are selectably positioned within the side tubes to permit the adjustment of the level of tension on the belt as it encircles the rear roller.

10. A personal vehicle comprising:
a frame;
a front roller mounted to the frame;
a rear roller mounted to the frame rearward of the front roller, the rear roller having a diameter less than the diameter of the front roller;
a continuous belt which extends around the front roller and the rear roller;
a first boot support fixed to the frame and having portions which extend above the belt to support a rider's first boot;
a second boot support fixed to the frame and having portions which extend above the belt to support a rider's second boot, wherein the belt extends through the first boot support and the second boot support:
a plurality of side rollers fixed to the frame and positioned within the belt;
a motor fixed to the frame to drive at least one of said rollers; and
at least one bogie wheel mounted to the frame and disposed to engage the exterior of the belt, the at least one bogie wheel causing the belt to engage the front roller over greater than 180 degrees of the circumference of the front roller.

11. The personal vehicle of claim 10 wherein the belt has a plurality of spaced parallel treads, wherein each tread has multiple segments, the segments of each tread being spaced from one another to define at least one valley, the valleys of all the treads being aligned to allow the at least one bogie wheel to pass through the valleys, and thereby restrict the sideward movement of the belt with respect to the frame.

12. The personal vehicle of claim 10 wherein all the rollers have at least one radially extending lip which extends along an edge of the belt.

13. The personal vehicle of claim 10 wherein the frame is flexible.

14. The personal vehicle of claim 10 wherein the bogie wheel causes the belt to engage the front roller over between 210 to 270 degrees of the circumference of the front roller.

15. A personal vehicle comprising:
a frame;
a front roller mounted to the frame;
a rear roller mounted to the frame rearward of the front roller, the rear roller having a diameter less than the diameter of the front roller;
a plurality of side rollers mounted to the frame between the front roller and the rear roller;
a continuous belt which extends around the front roller, the side rollers and the rear roller, wherein the front roller and the rear roller each have radially extending lips positioned on either side of the belt, and each side roller has a radially extending lip which extends along an edge of the belt,
a first boot support fixed to the frame and having portions which extend above the belt to support a rider's first boot;
a second boot support fixed to the frame and having portions which extend above the belt to support a rider's second boot, wherein the belt extends through the first boot support and the second boot support:
a motor fixed to the frame to drive at least one of said rollers, to thereby advance the belt to cause the vehicle to move, the roller lips being positioned to engage and position the belt, and to engage with a surface over which the vehicle is advanced.

16. The personal vehicle of claim 15 wherein the diameter of the side rollers is greater than the diameter of the rear roller, but less than the diameter of the front roller.

17. The personal vehicle of claim 15 wherein the belt has an upper run extending above the side rollers, and a lower run extending below the side rollers, and wherein the side rollers are positioned to engage both the belt upper run and the belt lower run.

18. The personal vehicle of claim 15 further comprising at least one bogie wheel mounted to the frame to engage the belt above the belt, and wherein the belt has a plurality of spaced parallel treads, wherein each tread has multiple segments, the segments of each tread being spaced from one another to define at least one valley, the valleys of all the treads being aligned to allow the at least one bogie wheel to pass through the valleys, and thereby restrict the sideward movement of the belt with respect to the frame.

19. A personal vehicle comprising:
a frame;
a front roller mounted to the frame and having a first diameter;

a rear roller mounted to the frame rearward of the front roller;

a plurality of side rollers mounted to the frame between the front roller and the rear roller, the side rollers having a diameter substantially less than the diameter of the front roller, wherein the rear roller has a diameter which is less than the diameter of the side rollers, and wherein the axis of the rear roller is positioned above the axes of the center rollers;

a continuous belt which extends around the front roller, the side rollers and the rear roller;

a first boot support fixed to the frame and having portions which extend above the belt to support a rider's first boot;

a second boot support fixed to the frame and having portions which extend above the belt to support a rider's second boot, wherein the belt extends through the first boot support and the second boot support:

a motor fixed to the frame to drive at least one of said rollers, to thereby advance the belt to cause the vehicle to move.

20. The personal vehicle of claim 19 wherein all the rollers have at least one radially extending lip which extends along an edge of the belt.

21. The personal vehicle of claim 19 further comprising cowling extending over most of the top surface of the belt and the motor, to shield an operator from contact with moving parts.

22. A personal vehicle comprising:

a frame;

a front roller mounted to the frame;

a rear roller mounted to the frame rearward of the front roller;

a belt which is looped around the front roller and the rear roller;

a motor mounted to the frame above the belt to drive the belt to cause the vehicle to advance;

a rigid yoke extending rearwardly from the frame;

a sled pivotably connected to the rigid yoke rearward of the belt;

a tiller which extends upwardly from the sled, having a handle which extends in the front to back direction, the tiller being connected to the sled to permit the operator of the vehicle to engage the tiller, and to adjust the position of the tiller and the connected sled, thereby controlling the direction of advancement of the moving vehicle; and a plurality of side rollers mounted to the frame within the looped belt, wherein the front roller is greater in diameter than the side rollers, and wherein the side rollers are greater in diameter than the rear roller.

23. A personal vehicle comprising:

a frame;

a front roller mounted to the frame and having a first diameter;

a rear roller mounted to the frame rearward of the front roller;

a plurality of side rollers mounted to the frame between the front roller and the rear roller, the side rollers having a diameter substantially less than the diameter of the front roller, wherein each side roller is rotatably mounted to a flexible axle which extends from a block which is mounted to the frame, such that the side rollers are deflectable with respect to the frame;

a continuous belt which extends around the front roller, the side rollers and the rear roller;

a first boot support fixed to the frame and having portions which extend above the belt to support a rider's first boot;

a second boot support fixed to the frame and having portions which extend above the belt to support a rider's second boot, wherein the belt extends through the first boot support and the second boot support:

a motor fixed to the frame to drive at least one of said rollers, to thereby advance the belt to cause the vehicle to move.

24. The personal vehicle of claim 23 further comprising a stop mounted to the frame above each flexible side roller axle, the stops serving to limit excessive upward deflection of the side roller axles.

* * * * *